United States Patent [19]

Iwabe

[11] Patent Number: 4,827,333
[45] Date of Patent: May 2, 1989

[54] DYNAMIC IMAGE CORRECTION METHOD OF OFFSETS OF VARIOUS IMAGE PICKUP CHARACTERISTICS OF A TELEVISION CAMERA SYSTEM CAUSED BY VARIATIONS IN VARIOUS IMAGE PICKUP CONDITIONS

[75] Inventor: Kuzuki Iwabe, Kodaira, Japan
[73] Assignee: Hitachi Denshi Kabushiki Kaisha, Tokyo, Japan
[21] Appl. No.: 52,166
[22] Filed: May 20, 1987

Related U.S. Application Data

[63] Continuation of Ser. No. 659,782, Oct. 11, 1984, abandoned.

[30] Foreign Application Priority Data

Oct. 11, 1983 [JP] Japan ................. 58-188477

[51] Int. Cl.[4] .................. H04N 9/093; H04N 9/09
[52] U.S. Cl. ........................ 358/5 X; 358/50
[58] Field of Search ................. 358/50, 51

[56] References Cited

U.S. PATENT DOCUMENTS

| | | | |
|---|---|---|---|
| 3,872,499 | 3/1975 | McConnell et al. | 358/51 |
| 4,320,414 | 3/1982 | Miyaji et al. | 358/51 |
| 4,472,740 | 9/1984 | Doi | 358/51 |
| 4,507,678 | 3/1985 | Iwabe et al. | 358/51 |
| 4,521,804 | 6/1985 | Bendell | 358/51 |
| 4,553,164 | 11/1985 | Labb | 358/51 |

FOREIGN PATENT DOCUMENTS

| | | | |
|---|---|---|---|
| 3232920 | 3/1984 | Fed. Rep. of Germany | 358/51 |
| 54-37525 | 3/1979 | Japan | 358/163 |
| 55-109081 | 8/1980 | Japan | 358/217 |
| 56-39686 | 4/1981 | Japan | 358/44 |
| 57-42286 | 3/1982 | Japan | 358/51 |
| 57-193193 | 11/1982 | Japan | 358/51 |
| 58-60887 | 4/1983 | Japan | 358/51 |
| 58-114586 | 7/1983 | Japan | 358/41 |
| 58-130686 | 8/1983 | Japan | 358/51 |
| 2126824 | 3/1984 | United Kingdom | 358/217 |

OTHER PUBLICATIONS

Ryan, John O., Ampex Corporation, "Recent Advances in Broadcast Camera Design", International Broadcasting Convention, Brighton, England, 20-28 Sep. 1980, Proceeding, pp. 27-30 (358/41).

*Primary Examiner*—James J. Groody
*Assistant Examiner*—Randall S. Svihla
*Attorney, Agent, or Firm*—Oblon, Fisher, Spivak, McClelland & Maier

[57] ABSTRACT

A method for dynamically correcting offsets of various pickup characteristics of a deflection system, a picture system and a mechanical system of a color television camera system in the course of an actual operation of the camera, so that the camera is maintained substantially under optimal picture shooting conditions. Selected components of the camera optical system, such as the pickup lens (optical systems), pickup devices and the like, are controlled by using as control parameters the iris value, zoom ratio, focal length and the like of the pickup lens, and image pickup conditions such as lighting conditions, surrounding temperature and time-dependent variation characteristics, and calculating exemplary correction values for correcting distortion of a pick-up image caused by the deflection system, picture system and mechanical systems. Based on the correction values, functional information which serve as references for correction signals adapted to correct offsets of the individual pickup characteristics are respectively calculated and stored. Upon an operation of the camera, information such as image pickup conditions and dynamic characteristics of the pickup lens are detected. Optimal correction signals are then calculated on the basis of the thus-detected information in accordance with the stored functional information of the corresponding correction signals. The optimal correction signals are thereafter fed to the corresponding optical system components to conduct dynamic (real time) correction on the images.

10 Claims, 4 Drawing Sheets

DYNAMIC IMAGE CORRECTION METHOD OF OFFSETS OF VARIOUS IMAGE PICKUP CHARACTERISTICS OF A TELEVISION CAMERA SYSTEM CAUSED BY VARIATIONS IN VARIOUS IMAGE PICKUP CONDITIONS

This application is a continuation of application Ser. No. 659,782, filed on Oct. 11, 1984, now abandoned.

BACKGROUND OF THE INVENTION (1) Field of the Invention

This invention relates to a method for correcting certain causes which lead to deterioration of the picture quality and which occur in a television camera system, especially in a camera lens, an optical system such as color-separating optical system, pickup devices and the like, and an electric circuit system.

(2) Description of the Prior Art

In the case of a color television camera making use of a plurality of pickup devices, the following various adjustments or corrections have conventionally been effected under certain specific conditions, namely, using a prescribed image pickup lens, a specific color-separating optical system and particular pickup devices with prescribed object distance and focal length under specific illumination:

(1) registration of the positions of images among various channels (hereinafter called "registration adjustment");

(2) registration of the focal points among the pickup devices in various channels (hereinafter called "focus tracking adjustment");

(3) adjustment of irregularity of picture signal levels among various channels when shot under the same brightness level (hereinafter called "shading adjustment");

(4) adjustment of the color reproducibility when a color chart is shot (hereinafter called "adjustment of color reproducibility"); and (5) adjustment of distortion of an image in each channel (hereinafter called "distortion adjustment").

However, the brightness, object distance and focal length will change in various ways depending on scenes to be shot when a television camera system is actually operated. Therefore, it is necessary to set the iris value and zoom ratio of each image pickup lens and the object distance at various values in accordance with the scenes to be shot. In addition, the lens may be replaced depending on the scene to be shot. When the lens is replaced or a image pickup condition such as the iris value, zoom ratio or object distance changes, image pickup characteristics such as the aberration characteristic, shading characteristic and distortion characteristic of the lens are also changed correspondingly. The levels of adjustments (1)–(5) obtained by using a prescribed pickup lens with specific object and focal length under a prescribed brightness level upon adjustment of the televison camera system may become unsuitable during an operation of the television camera system, thereby developing a problem that the thus-adjusted pickup characteristics may be offset from desirable pickup characteristics.

Besides, elements or devices to be used, such as the above-described lenses, pickup devices and the like have certain characteristics which vary depending on the time or temperature. Accordingly, there has been another problem that the chracteristics may become offset from their corresponding optimum values, which have in advance been adjusted upon adjustment of the television camera system, during the passage of the time or in accordance with temperature variations in the system.

BRIEF DESCRIPTION OF THE INVENTION

In order to solve these problems, an object of this invention is to detect in advance various pieces of characteristic information including fixed characteristic information of a pickup lens, color-separating optical systems, pickup devices and the like to be employed and their time- and temperature-dependent characteristic information and following changes in the iris values of each lens, object distance and focal distance as well as their time- and temperature-dependent changes during each operation of the television camera system, to automatically correct any offset (deviation) of the image pickup characteristics of each channel from desired image pickup characteristics (in real time).

In one aspect of this invention, there is thus provided a method for correcting at least one of various pickup characteristics of a television camera system which may be used under various image pickup conditions, which pickup characteristics are liable to changes in accordance with the various image pickup conditions, including the steps of storing, with respect to each of the pickup systems composed principally in combination of optical systems, pickup devices and electric circuits respectively, pieces of correction signal information for the various pickup characteristics, which pieces of correction signal information have in advance been calculated using the various image pickup conditions as parameters;

detecting the details of the combination of the pickup system and image pickup conditions during each operation of the television camera system and on the basis of the detection results, selecting at least one piece of correction signal information, which corresponds to the thus-detected details of the combination of the pickup system and image pickup conditions, as a group from the pieces of correction signal information, and producing a composite correction signal on the basis of the at least one piece of correction signal information selected as the group; and correcting the corresponding pickup characteristic by the composite correction signal automatically in real time.

The method of this invention permits automatic real-time correction of picture quality deterioration caused by static deviation of the characteristics of the optical system (lens, pickup elements of the color-separating optical system, etc.) and the electrical circuit system from their corresponding desired characteristics and the time- and temperature-dependent deterioration of such characteristics. Therefore, this invention can materialize a color camera system which can provide optimum images under any use conditions.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENTS

Figure 1:
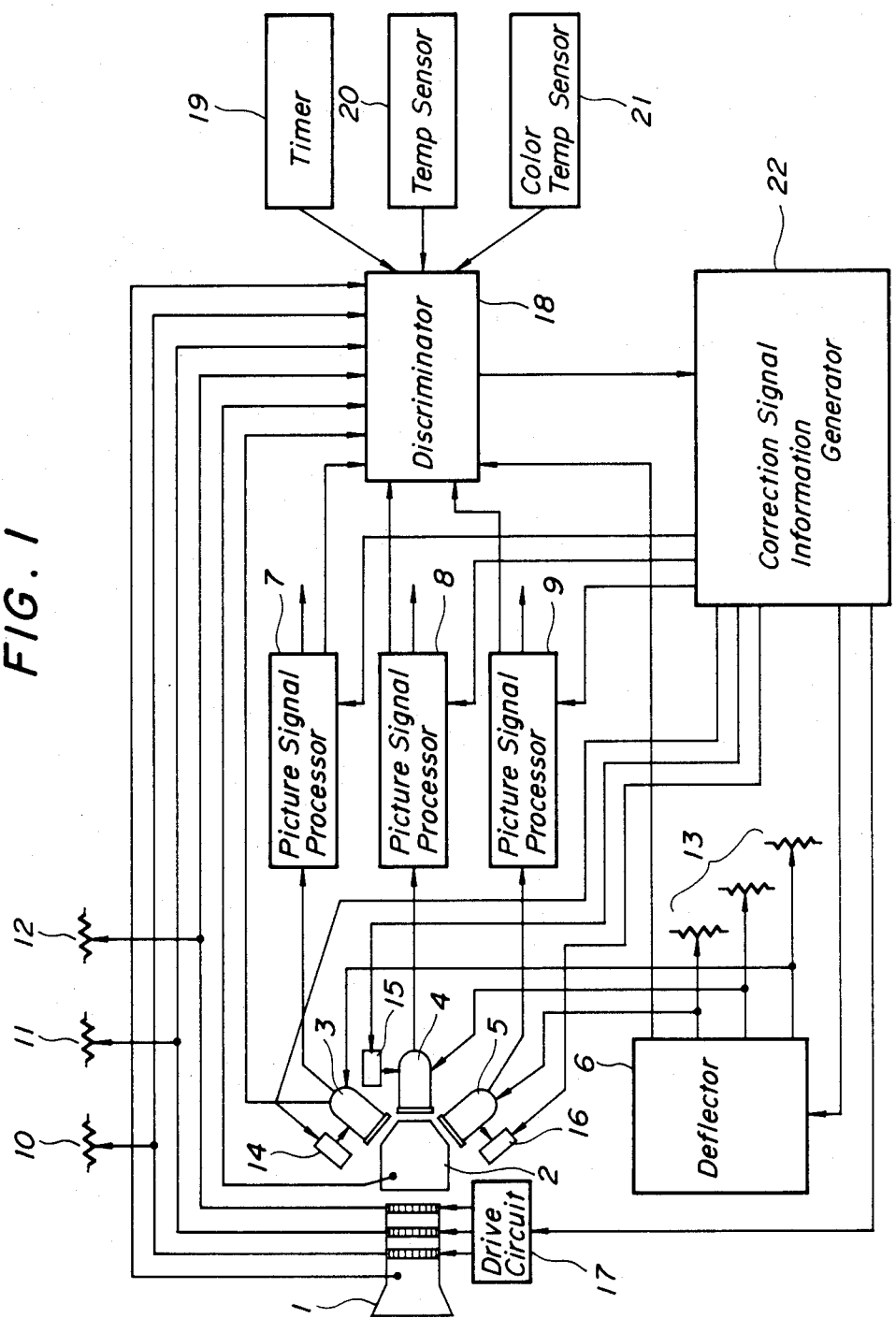
FIG. 1 is a block diagram showing one embodiment of the basic structure of a television camera system useful in the practice of the method of this invention.

FIG. 1 shows the basic structure of a television camera system useful in the practice of the method of this invention. In FIG. 1, there are illustrated a pickup lens 1, a color-separating optical system 2, pickup devices 3,4,5 containing deflector systems for the three channels, namely, the R, G and B channels respectively, a deflector 6, image signal processors 7, 8, 9 for the respective channels, adjusters 10,11,12 for the iris value, zoom ratio (focal length) and shooting distance of the pickup lens 1, a registration and distortion adjustment circuit 13 for the three channels, namely, the R, G and B channels, actuating mechanisms 14,15,16 for registering the positions of the three channels, namely, the G, R and B channels respectively, a drive circuit 17 for the iris value, zoom ratio and object distance of the pickup lens 1, a circuit 18 for discriminating devices under use and the image pickup state (hereinafter called "discriminator 18"), a timer 19, a circuit 20 for detecting the temperature within the camera system (hereinafter called "temperature sensor 20"), a circuit 21 for detecting the color temperature of illumination (hereinafter called "color temperature sensor"), and a circuit 22 for generating correction signal information (hereinafter called "correction signal information generator 22") which will be described in detail. In the correction signal information generator 22, there have in advance been set pieces of correction signal information for pickup characteristics such as distortion and registration correction signal information, shading and color reproducibility correction signal information and focus tracking and field curvature correction signal information for each combination of the elements or devices (the lens 1, color-separating optical system 2, pickup devices 3–5, and so on) to be employed, using various image pickup conditions (the iris value and zoom ratio of the lens 1, object distance, ambient temperature, etc.) as parameters. The correction signal information generator 22 produces a correction signal on the basis of elements or devices under use and each output from the discriminator 18. The resulting correction signal is fed to the processors 7, 8, 9 so as to control the processors 7, 8, 9, thereby to correct the particular pick-up characteristics.

The method of this invention will next be described, considering first of all the correction of a deflection system such as the distortion adjustment or registration adjustment. When the television camera system is used, there are detected by the discriminator 18 information indicating elements or devices under use, namely, which ones of the lens 1, the color-separating optical system 2, the pickup devices 3,4,5 including their respective deflection systems, electric circuits and the like are used, information pertaining the image pickup conditions (object distance, focal length, iris value and the like) of the lens 1, and information from the timer 19, temperature sensor 20 and color temperature sensor 21. These pieces of information are fed to the correction signal information generator 22 in real time. Based on these pieces of information, the correction signal information generator 22 produces a correction signal corresponding to the pieces of information at the above real time from distortion and registration correction signal information which has in advance been set. The thus-produced correction signal is then fed to the deflector 6, thereby correcting the distortion of an image or the positional displacement of the image in real time.

The correction operation of an image system such as shading or color reproducibility will next be described. As mentioned above, the discriminator 18 and correction signal information generator 22 have been fed in real time with information indicating which ones of the elements or devices are used, information pertaining to the image pickup conditions, etc. Based on this real-time information, the correction signal information generator 22 outputs a corresponding optimum signal in accordance with the preset shading or color reproducibility correction signal information. The resulting signal is thereafter fed to the picture signal processors 7,8,9 so as to control the picture signal processors 7,8,9, thereby to correct the shading, color reproducibility or the like in real time.

The correction operation of a mechanical system such as focus tracking or field cuvature will next be described. This operation is carried out to correct the sharpness deterioration of an image due to the on-axis color aberration and field curvature of the lens. In this correction operation, the position of each pickup device is shifted along its optical axis in accordance with the scanning points of the pickup device so as to optimize the sharpness.

The correction is also carried out in the same manner as in the preceding corrections. Namely, the correction signal information generator 22 produces a corresponding optimum correction signal from the preset focus tracking or field curvature correction signal information on the basis of real-time information fed from the discriminator 18. The correction signal is then output to the actuating mechanism 14, 15 or 16 for the positional registration of the pickup devices 3, 4 or 5 so that the actuating mechanism 14, 15 or 16 is corrected to optimize image sharpness in real time.

Here, it may be contemplated to effect the discrimination of each element or device under use (i.e., lens, color-separating optical system, pickup device including its deflection system or electric circuit system) at the discriminator 18 by giving a particular discrimination signal to each element or device and manually setting such a discrimination signal in the discriminator 18 upon actual use of the element or device or by giving specific discrimination code information to each element or device in a readable manner and upon actual application of the element or device, automatically reading out such specific discrimination code information and feeding it to the discriminator 18 so as to achieve automatic discrimination. Regarding the discrimination of the image pickup conditions of the lens 1, it may be contemplated to convert each object distance, zoom ratio and iris value to their corresponding voltages by means of a potentiometer or the like and then to feed the voltages to the discriminator 18. In addition, the type of each extender lens may be detected by giving a specific voltage to the extender lens and then transmitting the specific voltages as information by suitable means such as potentiometer.

Next, the calculation and generation of each correction signal will be described specifically.

(1) Discrimination of each element or device under use:

The discrimination of each element or device under use, such as each lens (inclusive of each extender), color-separating optical system, pickup device including its respective deflection system or electric circuit under use is carried out in the manner mentioned above.

(2) Sampling of image pickup conditions:

It is ideal or convenient to store correction signals for all conditions. However, this requires a hugh memory or a complex circuit for the generation of correction waveforms. Thus, this is not practical. Accordingly, after effecting the above-mentioned discrimination of each element or device under use, a plurality of conditions are chosen from the image pickup conditions (object distance d, focal length f, iris value F and the like). Then, the thus-chosen conditions are varied. For example, three different positions or values may be chosen for each condition in the following manner:

| Object distance di | infinite, middle, nearest |
|---|---|
| Focal length fj | widest, middle, narrowest |
| Iris value $F_k$ | fully opened, middle, fully closed |
| . | . |
| . | . |
| . | . |

(3) Calculation of each correction value for each sampled point:

The image pickup conditions are changed to the plural points or values chosen above. The deviations of image pickup characteristic such as registration, shading, focus tracking and the like at each sampled point are corrected by their respective correction means which are by themselves known in the art. Here, corresponding correction data $H(d_i, f_j, F_k, \ldots)$ for the respective image pickup characteristics at the sampled point are detected.

Where the characteristic data of each of the elements or devices, for example the magnification color aberration data of each lens has been known in advance, it is feasible to obtain their correction values respectively from these data instead of relying upon the calculation of correction data in the above methods (1)–(3).

(4) Approximation of sampled correction data:

The sampled correction data $H(d_i, f_j, F_k, \ldots)$ calculated in the above manner for the image pickup characteristics are then approximated by a single piece of composite data of a group of correction waveforms An (n = 1 −l) represented by the following equation:

$$H(d_i, f_j, F_k, \ldots) = \sum_{n=1}^{l} a_n(d_i, f_j, F_k, \ldots) A_n$$

where $$a_n(d_i, f_j, F_k, \ldots) \; [n = 1 - l]$$

means a group of weighting factors containing as their respective parameters image pickup distances, focal length, iris values, etc. which determine the composite data of the group of correction waveforms An. These weighting factors can be calculated in accordance with the known least squares weighting method. On the other hand, the group of correction waveforms An is a group of waveforms required for the correction of the above-mentioned image pickup characteristics such as registration, shading and the like, which waveforms may for example include D.C. waveforms, sawtooth waveforms and parabolic waveforms as well as waveforms containing components of higher degrees. Each of these correction waveform generating circuits is usually provided with the correction unit of its corresponding image pickup characteristic. However, as well as described herein, a generator of this correction waveform group An may be provided within the correction signal information generator 22 (see, FIG. 1).

(5) Calculation of stepless correction data:

From the group of weighting factors $a_n(d_i, f_j, F_k, \ldots)$ calculated aboe for various image pickup characteristics at each sampled point, there is derived a group of analog approximation weighting factors $a_n(d, f, F, \ldots)$ or further analog approximation correction data $H(d, f, F, \ldots)$ in accordance with the known series approximation method or the like.

$$H(d, f, F, \ldots) = \sum_{n=1}^{l} a_n(d, f, F, \ldots) A_n$$

As appears clear from the above equation of functional expressions, both the weighting factors and the correction data are determined in the form of correction functional information.

Now consider the registration adjustment performed using as parameters two image pickup conditions, namely object distance d and focal length f in which instance n in the above equation is one (1), and the correction waveform An is a group of sawtooth correction waveforms. In order to obtain the correction data H(d,f), the level of the sawtooth waveforms An = 1 is controlled by a group of weighting factors $a_{n=1}(d,f)$ determined by the following equation of functional expressions:

$$H(d,f) = a(d,f)$$
$$= K_1 + K_2 + K_3 d^2 + K_4 f + K_5 df + K_6 d^2 f +$$
$$K_7 f^2 + K_8 df^2 + K_9 d^2 f^2$$

where
d = object distance
f = focal length and
$K_1 - K_9$ = coefficients.

The coefficients $K_1-K_9$ are obtained by a substitution method using respective sampled correction values detected at a total of nine sampling points (which is determined by the combination of three sampling points for object distance with three sampling points for focal length as stated in the preceding paragraph (2)) and values of d and f at the respective sampling points.

Therefore, the coefficients $K_1-K_9$ are determined by the following simultaneous quadratic equations:

$$a(d_1, f_1) = K_1 + K_2 d_1 + K_3 d_1^2 + K_4 f_1 + K_5 d_1 f_1 +$$
$$K_6 d_1^2 f_1 + K_7 f_1^2 + K_8 d_1 f_1^2 + K_9 d_1^2 f_1^2$$

$$a(d_1, f_2) = K_1 + K_2 d_1 + K_3 d_1^2 + K_4 f_2 + K_5 d_1 f_2 +$$
$$K_6 d_1^2 f_2 + K_7 f_2^2 + K_8 d_1 f_2^2 + K_9 d_1^2 f_2^2$$

$$a(d_1, f_3) = K_1 + K_2 d_1 + K_3 d_1^2 + K_4 f_3 + K_5 d_1 f_3 +$$
$$K_6 d_1^2 f_3 + K_7 f_3^2 + K_8 d_1 f_3^2 + K_9 d_1^2 f_3^2$$

-continued $$a(d_3,f_3) = K_1 + K_2 d_3 + K_3 d_3^2 + K_4 f_3 + K_5 d_3 f_3 +$$
$$K_6 d_3^2 f_3 + K_7 f_3^2 + K_8 d_3 f_3^2 + K_9 d_3^2 f_3^2$$

The correction accuracy can be improved by approximating the sampled correction values in accordance with simultaneous equations of function of third or higher order.

(6) Setting of a group of stepless weighting factors or correction data:

The above-calculated group of stepless weighting factors $a_n(d,f,F, \ldots)$ or correction data $H(d,f,F, \ldots)$ for various image pickup characteristics is set in the correction signal information generator (see, FIG. 1).

This setting of the weighting factors or correction data may be effected by providing a memory within the correction signal information generator 22 and storing such weighting factors or correction data in the form of corresponding functions in the memory as will be described herein. Alternatively, they may be set by making up their corresponding function-setting circuits (potentiometers or the like) with respective hardware.

The above operations (1)–(6) are performed prior to actual application of the television camera system so that correction signal information for each image pickup condition is set in the correction signal information generator 22 while making use of the above-mentioned various image pickup conditions as parameters.

(7) Generation of correction signal:

When the television camera system is operated, the correction signal information generator 22 receives in real time information on the elements or devices under use and the image pickup conditions (object distance d, focal length f, iris value F and the like) from the discriminator 18. Based on these information, the correction signal information generator 22 produces a group of corresponding weighting factors $a_n(d,f,F, \ldots)$ for various image pickup characteristics in accordance with these information. The group of weighting factors is then used at the correction waveform generator to control the composite data of corresponding correction waveforms An for the corresponding image pickup characteristis, thereby calculating correction signals respectively for the image pickup characteristics. Alternatively, the correction signal information generator 22 produces correction data $H(d,f,F, \ldots)$ for the corresponding image pickup characteristics and then outputs them as correction signals for the corresponding image pickup characteristics.

(8) Correction of each shooting characteristic:

The thus-generated correction signal for each image pickup characteristic is then fed to the corresponding image pickup characteristic correction unit to correct the image pickup characteristic. It is thus possible to obtain optimum images irrespective of changes in the image pickup conditions.

The structure of the correction signal information generator 22 will next be described in detail.

Figure 2:
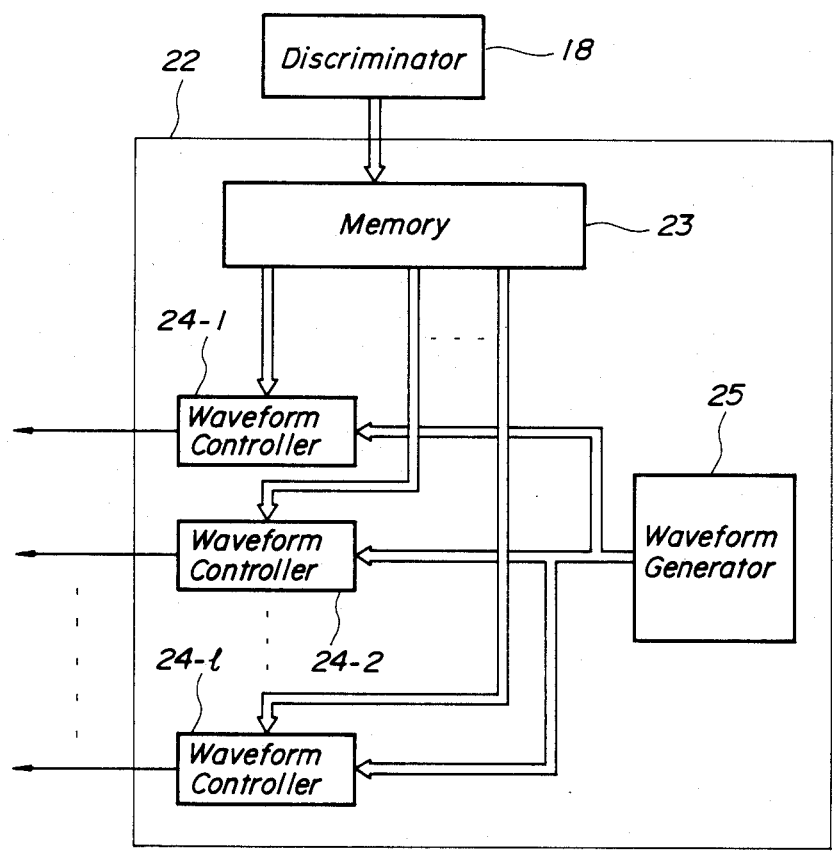
FIG. 2 is a block diagram of a correction signal information generating circuit (hereinafter called "correction signal information generator")
Figure 3:
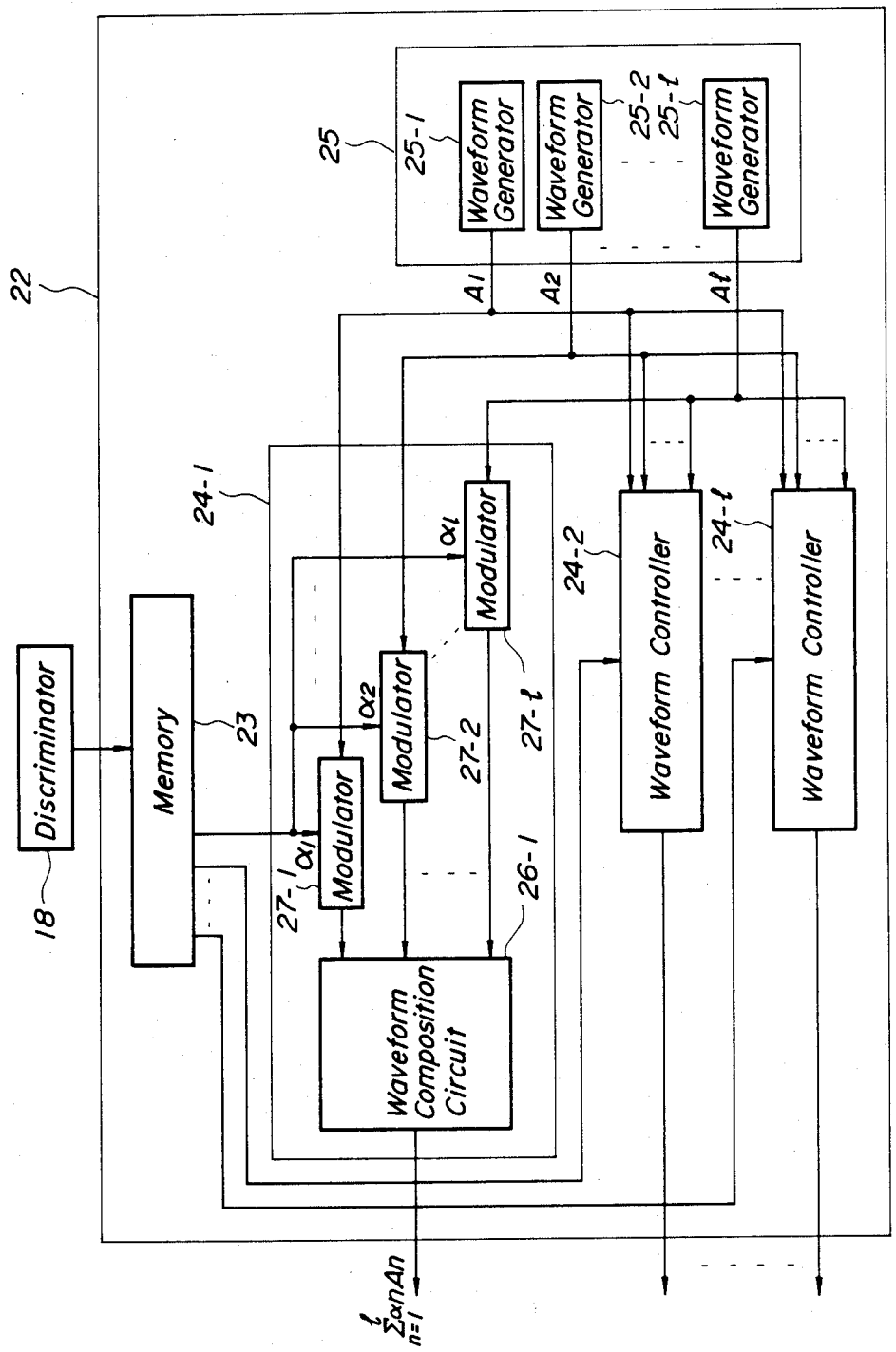
FIG. 3 is a block diagram of another correction signal information generator.
Figure 4:
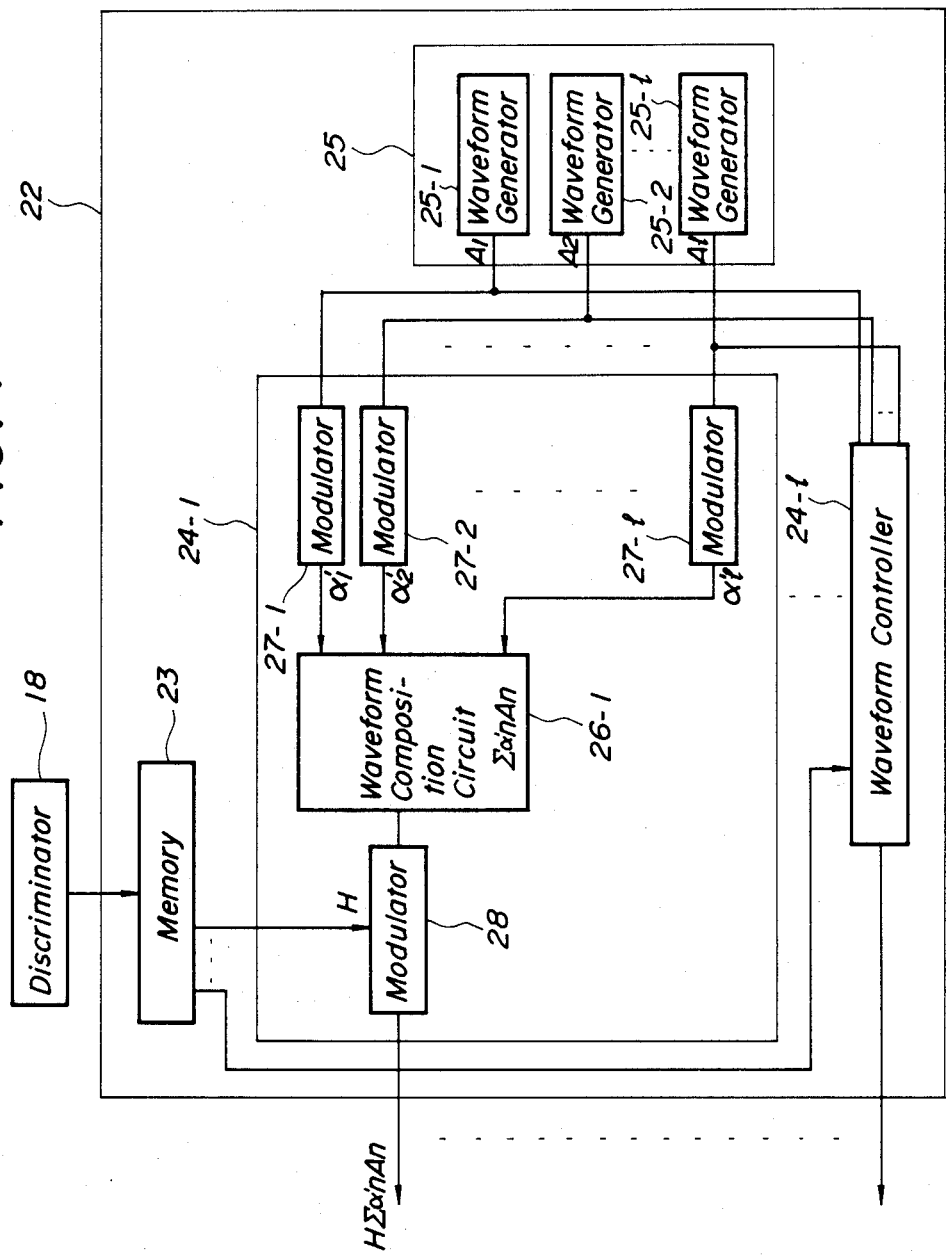
FIG. 4 is a block diagram of a further correction signal information generator.

FIG. 2 is a simplified block diagram showing the outline of the structure of one embodiment of the correction signal information generator 22. FIG. 3 illustrates the structure in further detail. FIG. 4 is similar to FIG. 3 but illustrates another embodiment of the correction signal information generator 22. In these drawings, numeral 23 indicates a memory circuit (hereinafter called "memory 23") in which there are stored the group of weighting factors $a_n(d,f,F, \ldots)$ or correction data $H(d,f,F, \ldots)$ as correction signal information for the above-described various image pickup conditions, whilst numerals 24-1–24-l designate correction signal waveform control circuits (hereinafter called "waveform controllers 24-1–24-l" respectively) adapted to control correction waveforms. For example, the waveform controller 24-1 may be adapted to effect the registration and distortion corrections whereas the waveform controller 24-2 may be used as a correction signal waveform control circuit for performing the shading and color reproducibility corrections. Designated at numeral 25 is a correction signal waveform generator (hereinafter called "waveform generator 25") which produces correction signals required for the correction of each image pickup characteristic. The waveform generator 25 is composed of a group of basic waveform generating circuits (hereinafter called "waveform generators") 25-1–25-l so that it can generate a group of correction waveforms An required for the correction of various image pickup characteristics. (The waveform generator 25-1 may for example be used for output D.C. waveforms, the waveform generator 25-2 sawtooth waveforms, a third waveform generator (not shown) parabolic waveforms . . . and the waveform generator 25-l waveforms of a higher degree. Numeral 26-1 indicates a waveform composition circuit which generates correction signal waveforms suitable for the correction of the corresponding image pickup conditions. Designated at numerals 27-1–27-l are circuits adapted to change waveforms, amplitudes and phases (hereinafter called "modulators"). They change the amplitudes and phases of correction signal waveforms from their corresponding waveform generators 25-1–25-l on the basis of the values of their corresponding weighting factors $a_n(d,f,F, \ldots)$. In FIG. 4, numeral 28 indicates a circuit for changing the amplitude and phase of each correction signal (hereinafter called "modulator") and changes the amplitudes and/or phases of corresponding correction signals on the basis of their corresponding correction data $H(d,f,F, \ldots)$.

The waveform generator 25 and waveform composition circuit 26 are provided in the correction signal information generator 22 in the above embodiments. They may however be omitted provided that the correction circuits provided respectively with the correction units for these image pickup characteristics, for example, the deflector 6 (see FIG. 1) or the picture signal processors 7,8,9 (see FIG. 1) for picture signals from their corresponding channels are used in place of the waveform generator 25 and waveform composition circuit 26, respectively for the registration adjustment and shading adjustment. This operation is performed in the following manner. Namely, when information pertaining to the elements or devices under use and the image pickup conditions is fed in real time from the discriminator 18 to the memory 23 in the course of an operation of the television camera system, a group of weighting factors $an(d,f,F, \ldots)$ or correction data $H(d,f,F, \ldots)$ which correspond to the thus-fed information and are pieces of correction signal information stored in advance for corresponding various image pickup characteristics are read out from the memory 23, thereby directing the corresponding correction signals to the waveform controllers 24-1–24-l. At the waveform controllers 24-1–24-l, the waveforms of signals for the corresponding image pickup characteristics, which signals have been output from the correction signal generator 25, are controlled in accordance with the thus-fed correction signal information. Therefore, the signals are converted to their corresponding optimum correction signals and are then fed to the correction units for the corresponding image pickup characteristics.

Here, the structure depicted by way of example in FIG. 3 is one example of structure capable of obtaining optimum correction signals by controlling the composite data of the group of correction waveforms An in accordance with the group of the thus-given weighting factors $a_n(d,f,F,...)$. On the other hand, the structure shown also by way of example in FIG. 4 is one example of structures which can obtain optimum correction signals by controlling the amplitude and phase of each composite correction signal waveform in accordance with the thus-given correction data $H(d,f,F,...)$.

In the method of this invention, the real-time correction of each image pickup characteristic is carried out in the manner mentioned above. When either one of the image pickup characteristics is corrected at real time in accordance with the image pickup conditions at that specific time, one or more other image pickup characteristics may then be changed secondarily following the correction of the former image pickup characteristic. When the registration correction is performed for instance, a centering offset occurs due to the resulting misregistration between the optical axis of the optical system and the scanning center. Therefore, the correction of the centering offset must be effected as a secondary correction. The term "secondary change in a image pickup characteristic" as used herein means a change which occurs secondarily in the image pickup characteristic as mentioned above.

Such a secondary change may be corrected in the following manner.

The registration adjustment is first of all performed under standard image pickup conditions. Thereafter, image pickup conditions, for example, two image pickup conditions (i,j) are changed to conduct the above-mentioned registration correction in real time. (Here, the correction data Hi,Hj have been preset in the correction signal information generator 22.) Resulting centering offsets Ci,Cj are then measured, on which reverse correction data for the centering offsets are calculated.

Namely, the reverse correction data Cn for the centering offset can be obtained by the following conversion equation:

$$C_n = -\frac{C_i - C_j}{H_i - H_j} H_n$$

The above-obtained reverse correction data Cn for the centering offset is then set in the memory 23 of the correction signal information generator 22. In association with the above-described real-time registration correction, the waveform of the correction signal is controlled by the reverse correction data Cn so as to perform the reverse correction of the centering offset. Alternatively, the group of weighting factors $a_n(d,f,F,...)$ or correction data $H_n(d,f,F,...)$ for the registration correction which is calculated in the above-mentioned manner and is stored in advance in the memory 23 may be calculated and set as data reflecting the reverse correction data Cdn for the centering offset.

As described in the present embodiment, correction signals which are to be fed to the correction units for various image pickup characteristics may be continually output to the units to be corrected. In a television camera system, final outputs are picture images whose quality levels are judged by the visual sense of a man. Therefore, the correction signals are not absolutely required to be continuous. Corrections may be made with such a time interval that does not give the sense of unnaturalness to the visual sense of a man. This permits output of correction signals by the time-dividing technique, thereby making it possible to reduce the operation time and the number of transfer lines in the correction signal information generator 22 or the like.

For the same reasons as mentioned above, the information representing the elements or devices under use and the image pickup conditions of the television camera system is not necessarily required to be fed continuously to the discriminator 18. By employing the time-dividing technique, it may be possible to reduce the number of transfer lines.

The above embodiments of this invention have been described with reference to the three channel system of R, G and B only. Needless to say, the method of this invention can bring about similar advantageous effects when applied to any television camera system equipped with at least two pickup devices.

By the way, it does not appear to be directly related to the technical concept of this invention in which parts of the television camera system elements and circuits such as the discriminator 18, timer 19, temperature sensor 20, color temperature sensor 21 and correction signal information generator 22 should be provided. The specific installation places of these elements and circuits are thus not referred to in the above description of the embodiments.

Namely, it may be feasible to provide all of these elements and circuits within the main body of the television camera system. Alternatively, some or all of these elements and circuits may be constructed integrally with the pickup lens.

Having now fully described the invention, it will be apparent to one of ordinary skill in the art that many changes and modifications can be made thereto without departing from the spirit or scope of the invention as set forth herein.

What is claimed is:

1. A dynamic image correction method for a television camera system equipped with a plurality of image pickup devices, said method being effective for automatic real-time correction of offsets of image pickup characteristics of the television camera system, which offsets occur in accordance with changes in image pickup conditions during operational use of the television camera system, comprising:

(a) in a test mode prior to operational use of the television camera system,
   (a-1) selecting as parameters a plurality of predetermined image pickup conditions which affect the quality of a picked-up image,
   (a-2) setting a plurality of sampling points for each of the thus-selected image pickup conditions with respect to each of combinations of components of the television camera system which are to be used, the components including an optical system containing an image pickup lens, the image pickup devices and electric circuits associated therewith, and then varying each said selected image pickup condition through plural different states corresponding respectively to the sampling points, (a-3) detecting at each said sampling point for the thus-varied image pickup conditions (i) offsets of first image pickup characteristics inclusive of misregistration and distortion of a picked-up image, which offsets have appeared as offsets of the picked-up image along an image-forming plane of the television camera system and can be corrected by adjusting a deflection system of the television camera system, (ii) offsets of second image pickup characteristics inclusive of shading and deterioration of color reproducibility, which offsets have appeared as offsets of the levels of picture signals and can be corrected by adjusting a picture signal processing system of the television camera system, and (iii) offsets of third image pickup characteristics inclusive of focus tracking and curvature of field, which offsets have appeared as offsets of focusing in the image-forming plane and can be corrected by adjusting an actuating system operatively connectd with each of the image pickup devices for shifting the latter in the direction of the optical axis of the television camera system, (a-4) correcting the respective offsets (i), (ii) and (iii) detected at each said sampling point by corresponding ones of correcting means associated respectively with the deflection system, the picture signal processing system and the image pickup-device actuating system, and deriving correction values required at that time for the correction of the respective detected offsets, and (a-5) calculating, based on the thus-derived correction values, correction functional information in the form of coefficients and expressions of functions to be used to generate a continuous set of correction signals for each said combination of the components, and storing the thus-calculated correction functional information; and (b) during subsequent operational use of the television camera system, (b-1) detecting from time to time a combination of components of the television camera system being used and also each of the image pickup conditions existing at that time, (b-2) choosing from the correction functional information previously stored in the test mode, pieces of correction functional information corresponding to the combination of components and the image pickup conditions detected in said step (b-1) of detecting, and then generating correction signals for the correction of corresponding ones of said offsets of image pickup characteristics based on the thus-chosen correction functional information, and (b-3) feeding the thus-generated correction signals to corresponding ones of the correcting means associated respectively with the deflection system, the picture signal processing system and the image pickup-device actuating system, thereby automatically correcting offsets of image pickup characteristics caused by changes in the image pickup conditions which occur during operational use of the television camera system.

2. A method as claimed in claim 1, wherein the selected predetermined image pickup conditions include selected values of iris value, zoom ratio and object distance of an image pickup lens, lighting conditions, ambient temperature, and aging and deterioration of the image pickup devices and the electric circuits associated therewith.

3. A method as claimed in claim 1, wherein each piece of the correction functional information is calculated and stored in the test mode prior to operational use of the television camera system by the following consecutive steps:

(a) distinguishing the components from one another;

(b) setting a plurality of sampling points for each said selected image pickup condition with respect to each of combinations of the thus-distinguished components, and then varying each said selected predetermined image pickup condition through plural different states corresponding respectively to the sampling points;

(c) detecting at each said sampling point the respective offsets (i), (ii) and (iii) occurring in accordance with the thus-varied image pickup condition, and correcting the respective detected offsets by the corresponding correction means associated respectively with the deflection system, the picture signal processing system and the image pickup-device actuating system, and further deriving the correction values required at that time for the correction of the respective detected offsets;

(d) approximating the thus-derived correction values by a single piece of composite data of a group of correction waveforms by using the following equation:

$$H(d_i, f_j, F_k, \ldots) = \sum_{n=1}^{l} \alpha_n(d_i, f_j, F_k, \ldots) A_n$$

where
$H(d_i, f_j, F_k, \ldots)$ = correction values,
$A_n$ = a group of correction waveforms required for the correction of the offsets (i), (ii) or (iii), and
$\alpha_n(d_i, f_j, F_k, \ldots)$, where $n = 1$ to $l$, = a group of weighting factors containing as their respective parameters and being functionally variable with the selected image pickup conditions which determine the level of one correction waveform at each said sampling point;

(e) based on the groups of weighting factors at the respective sampling points, further approximating the once-approximated correction values and groups of correction waveforms by using a series approximation method, thereby deriving at least one of a continuous set of groups of weighting factors $\alpha_n(d, f, F, \ldots)$ and a continuous set of correction values $H(d, f, F, \ldots)$; and (f) storing the thus-approximated continuous set of groups of weighting factors $\alpha_n(d, f, F, \ldots)$ or the continuous set of correction values $H(d, f, F, \ldots)$ as the corresponding ones of the pieces of correction functional information in the form of the coefficients and the expressions of functions.

4. A method as claimed in claim 1, for use in automatic real-time correction of secondary offsets of fourth image pickup characteristics produced as a result of the correction of the offsets (i) of first image pickup characteristics, further comprising:

in the test mode prior to operational use of the television camera system, detecting secondary offsets (iv) of fourth image pickup characteristics including centering offsets during said step (a-4) of the offsets (i) of first image pickup characteristics detected at each said sampling point, and calculating, based on the extent of the thus-detected secondary offsets (iv) and the stored correction functional information for correcting the offsets (i) of first image pickup characteristics, correction functional information in the form of coefficients and expressions of functions, and storing the thus-calculated correction functional information; and during subsequent operational use of the television camera system, in response to said step (b-1) of detecting of the combination of components being used and of the image pickup conditions, choosing from the last-named correction functional information previously stored in the test mode, pieces of correction functional information corresponding to the detected combination of components and the detected image pickup conditions, generating correction signals for correcting the offsets (iv) of fourth image pickup characteristics based on the thus-chosen correction functional information, and feeding the last-named correction signals to the correcting means associated with the deflection system of the television camera system, thereby automatically correcting the offsets (iv) of fourth image pickup characteristics simultaneously with the correction of the offsets (i) to (iii) of first to third image pickup characteristics.

5. A method as claimed in claim 1, wherein the television camera system is a color television camera system in which the optical system includes an optical color separation system.

6. A dynamic image correction method for a television camera system equipped with a plurality of image pickup devices, said method being effective for automatic real-time correction of offsets of image pickup characteristics of the television camera system, which offsets occur in accordance with changes in image pickup conditions during operational use of the television camera system, comprising:

(a) in a test mode prior to operational use of the television camera system, (a-1) selecting as parameters a plurality of predetermined image pickup conditions which affect the quality of a picked-up image, (a-2) setting a plurality of sampling points for each of the thus-selected image pickup conditions with respect to each of combinations of components of the television camera system which are to be used, the components including an optical system containing an image pickup lens, the image pickup devices and electric circuits associated therewith, and then varying each said selected image pickup condition through plural different states corresponding respectively to the sampling points, (a-3) detecting at each said sampling point for the thus-varied image pickup conditions (i) offsets of first image pickup characteristics inclusive of misregistration and distortion of a picked-up image, which offsets have appeared as offsets of the picked-up image along an image-forming plane of the television camera system and can be corrected by adjusting a deflection system of the television camera system, (ii) offsets of second image pickup characteristics inclusive of shading and deterioration of color reproducibility, which offsets have appeared as offsets of the levels of picture signals and can be corrected by adjusting a picture signal processing system of the television camera system, and (iii) offsets of third image pickup characteristics inclusive of focus tracking and curvature of field, which offsets have appeared as offsets of focusing in the image-forming plane and can be corrected by adjusting an actuating system operatively connected with each of the image pickup devices for shifting the latter in the direction of the optical axis of the television camera system, (a-4) deriving, directly from the image pickup characteristic data of each of the components of the television camera system, correction values required for the correction of the respective offsets (i), (ii) and (iii) detected at each said sampling point, and (a-5) calculating, based on the thus-derived correction values, correction functional information in the form of coefficients and expressions of functions to be used to generate a continuous set of correction signals for each said combination of the components, and storing the thus-calculated correction functional information; and (b) during subsequent operational use of the television camera system, (b-1) detecting from time to time a combination of components of the television camera system being used and also each of the image pickup conditions existing at that time, (b-2) choosing from the correction functional information previously stored in the test mode, pieces of correction functional information corresponding to the combination of components and the image pickup conditions detected in said step (b-1) of detecting, and then generating correction signals for the correction of corresponding ones of said offsets of image pickup characteristics based on the thus-chosen correction functional information, and (b-3) feeding the thus-generated correction signals to corresponding ones of the correcting means associated respectively with the deflection system, the picture signal processing system and the image pickup-device actuating system, thereby automatically correcting the offsets of image pickup characteristics caused by changes in image pickup conditions which occur during operational use of the television camera system.

7. A method as claimed in claim 6, wherein the selected predetermined image pickup conditions include selected values of iris value, zoom ratio and object distance of an image pickup lens, lighting conditions, ambient temperature, and aging and deterioration of the image pickup devices and the electric circuits associated therewith.

8. A method as claimed in claim 6, wherein each piece of the correction functional information is calculated and stored in the test mode prior to operational use of the television camera system by the following consecutive steps:

(a) distinguishing the components from one another;

(b) setting a plurality of sampling points for each said selected image pickup condition with respect to each of combinations of the thus-distinguished components, and then varying each said selected predetermined image pickup condition through plural different states corresponding respectively to the sampling points;

(c) detecting at each said sampling point the respective offsets (i), (ii) and (iii) occurring in accordance with the thus varied image pickup condition, then determining, directly from the image pickup characteristic data of the components, offsets occurring at each said sampling point, which determined offsets correspond to the detected offsets (i), (ii) and (iii), and deriving the correction values required for the correction of the thus-determined offsets;

(d) approximating the thus-derived correction values by a single piece of composite data of a group of correction waveforms by using the following equation:

$$H(d_i, f_j, F_k, \ldots) = \sum_{n=1}^{l} a_n(d_i, f_j, F_k, \ldots) A_n$$

where
$H(d_i, f_j, F_k, \ldots) 0 =$ correction values,
$A_n =$ a group of correction waveforms required for the correction of the offsets (i), (ii) or (iii), and
$a_n(d_i, f_j, F_k, \ldots)$, where $n = 1$ to $l$, $=$ a group of weighting factors containing as their respective parameters and being functionally variable with the selected image pickup conditions which determine the level of one correction waveform at each said sampling point;

(e) based on the groups of weighting factors at the respective sampling points, further approximating the once-approximated correction values and groups of correction waveforms by using a series approximation method, thereby deriving at least one of a continuous set of groups of weighting factors $a_n(d, f, F, \ldots)$ and a continuous set of correction values $H(d, f, F, \ldots)$; and (f) storing the thus-approximated continuous set of groups of weighting factors $a_n(d, f, F, \ldots)$ or the continuous set of correction values $H(d, f, F, \ldots)$ as the corresponding ones of the pieces of correction functional information in the form of the coefficients and the expressions of functions.

9. A method as claimed in claim 6, for use in automatic real-time correction of secondary offsets of fourth image pickup characteristics produced as a result of the correction of the offsets (i) of first image pickup characteristics, further comprising:

in the test mode prior to operational use of the television camera system, detecting secondary offsets (iv) of fourth image pickup characteristics including centering offsets during said step (a-4) of deriving the correction values required for the correction of the offsets (i) of first image pickup characteristics detected at each said sampling point, and calculating, based on the extent of the thus-detected secondary offsets (iv) and the stored correction functional information for correcting the offsets (i) of first image pickup characteristics, correction functional information in the form of coefficients and expressions of functions, and storing the thus-calculated correction functional information; and during subsequent operational use of the television camera system, in response to said step (b-1) of detecting the combination of components being used and of the image pickup conditions, choosing from the last-named correction functional information previously stored in the test mode, pieces of correction functional information corresponding to the detected combination of components and the detected image pickup conditions, generating correction signals for correcting the offsets (iv) of fourth image pickup characteristics based on the thus-chosen correction functional information, and feeding the last-named corrections signals to the correcting means associated with the deflection system of the television camera system, thereby automatically correcting the offsets (iv) of fourth image pickup characteristics simultaneously with the correction of the offsets (i) to (iii) of first to third image pickup characteristics.

10. A method as claimed in claim 6, wherein the television camera system is a color television camera system in which the optical system includes an optical color separation system.

* * * * *